Sept. 26, 1933.   G. A. DE VLIEG   1,927,924
TOOL SPINDLE FIXTURE
Filed Dec. 4, 1926   2 Sheets-Sheet 1
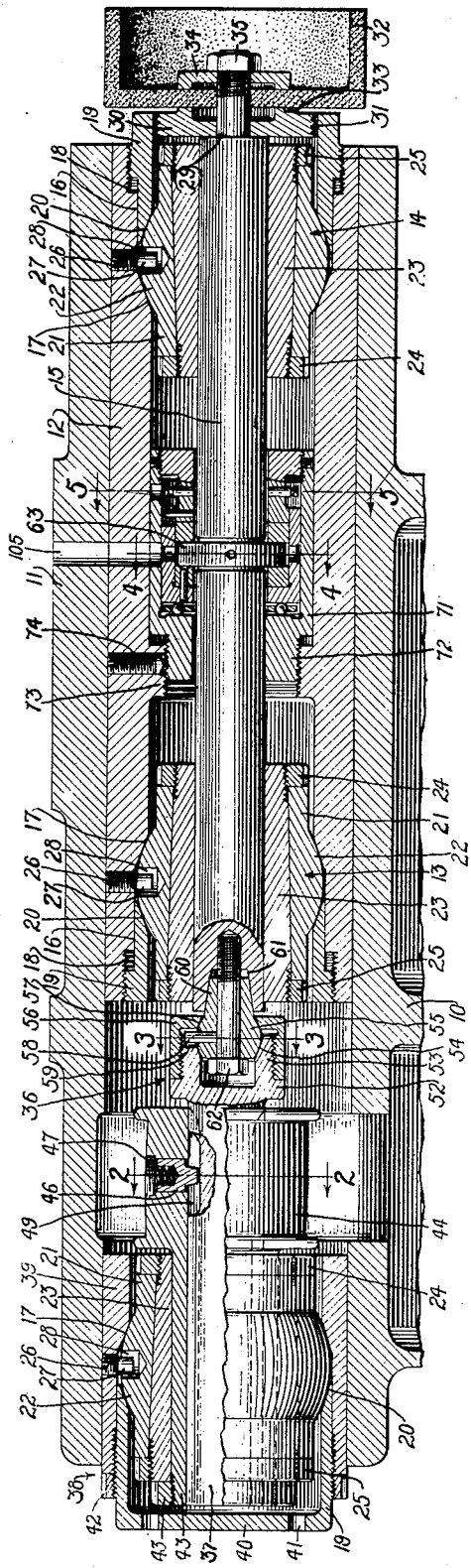
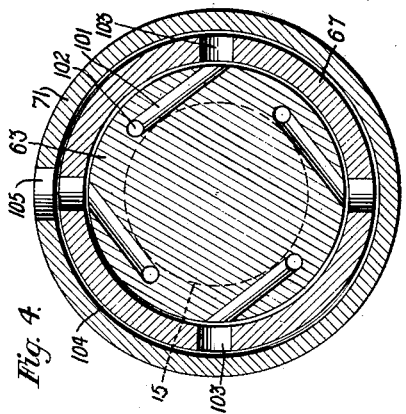
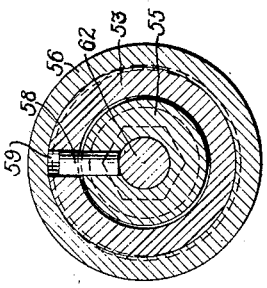
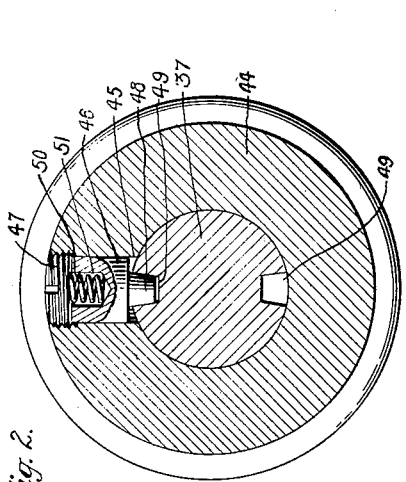
Inventor
Gerard A. DeVlieg
By Churdall Parker Carlson
Att'ys Sept. 26, 1933.    G. A. DE VLIEG    1,927,924
TOOL SPINDLE FIXTURE
Filed Dec. 4, 1926    2 Sheets-Sheet 2

Inventor
Gerard A. DeVlieg.
By Chindahl Parker Carlson
Att'ys.

Patented Sept. 26, 1933

1,927,924

UNITED STATES PATENT OFFICE 1,927,924

TOOL SPINDLE FIXTURE

Gerard A. De Vlieg, Rockford, Ill.

Application December 4, 1926. Serial No. 152,670

18 Claims. (Cl. 308—161)

The present invention relates to improvements in spindle fixtures for machine tools, such as grinding machines, lathes and end milling machines, and has particular reference to improvements in the spindle fixture disclosed in my copending application, Serial No. 62,339, filed October 14th, 1925 (Patent No. 1,682,835).

In machine tools where the end thrust on the spindle is perpendicular to the plane of the cutting face, end play is objectionable since it produces a wavy or irregular surface on the work, and hence lowers the accuracy and efficiency of operation. The primary object of my invention resides in the provision of a novel spindle fixture in which objectionable end play is prevented.

In my said copending application, spindle aligning means is shown for keeping the spindle in one position at all times, i. e. for holding the spindle against a fixed shoulder. An important object of the present invention is to provide means for eliminating all binding at the bearings supporting the spindle so as to permit the aligning means to have absolute control.

Another object is to provide a new and improved spindle fixture which is self-adjustable and self-aligning to compensate for expansion and contraction, resulting from changes in temperature, and to compensate for wear, thereby preventing end play and insuring efficient operation over a long period of time.

A more specific object resides in the provision of a self-aligning and self-actuating mechanism which acts against both sides of means rigid or integral with the spindle, and which is operable through friction or looseness at each side of said means to automatically adjust itself so as to apply a constant pressure against both sides of said means at all times under varying conditions.

Still another object resides in the provision of means for eliminating end play which is simple and inexpensive in construction, which is efficient and certain in operation, and which is durable and sturdy.

In the accompanying drawings, Figure 1 is a longitudinal sectional view of a spindle fixture embodying the features of my invention.

Fig. 2 is a transverse sectional view taken along line 2—2 of Fig. 1.

Fig. 3 is a transverse sectional view taken along line 3—3 of Fig. 1.

Fig. 4 is a transverse sectional view taken along line 4—4 of Fig. 1.

Figure 5:
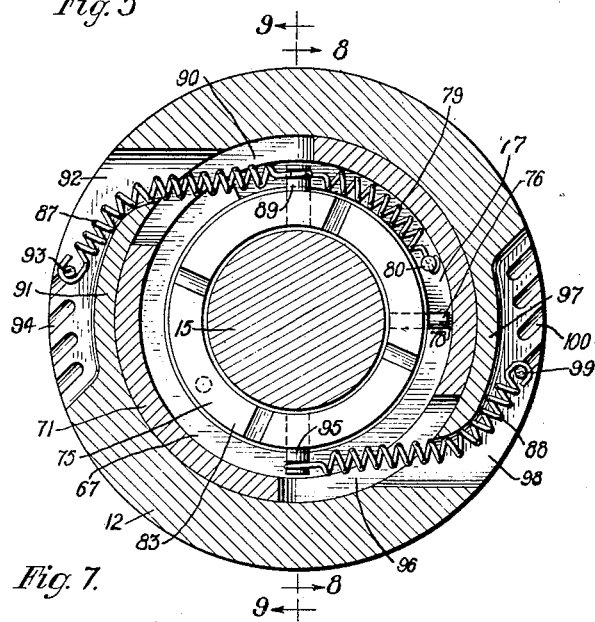
Fig. 5 is a transverse sectional view taken along line 5—5 of Fig. 1.
Figure 6:
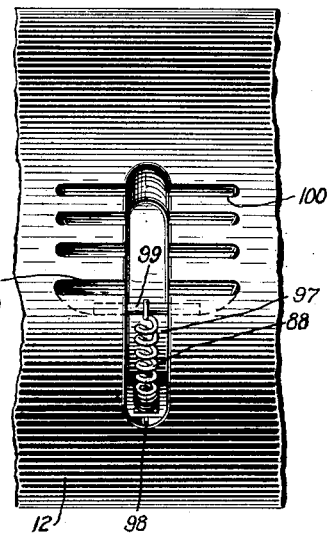
Fig. 6 is a fragmentary side elevation of the spindle fixture.
Figure 7:
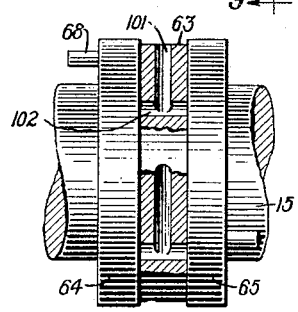
Fig. 7 is a fragmentary detailed view, partially in section of the fixture.
Figure 9:
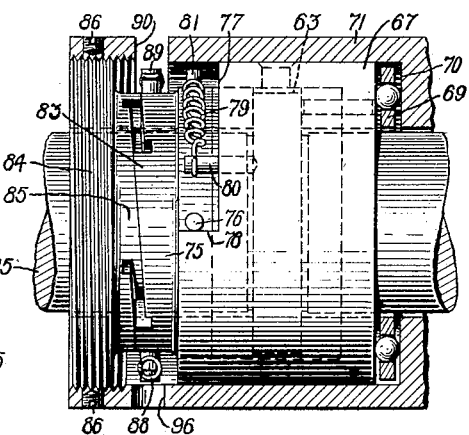
Fig. 9 is a view similar to Fig. 8, but partially sectioned along line 9—9 of Fig. 5.

While the invention is susceptible of various modifications and alternative constructions, I have shown in the drawings and will herein describe in detail the preferred embodiment thereof, but it is to be understood that I do not thereby intend to limit the invention to the specific form disclosed, but intend to cover all modifications and alternative constructions falling within the spirit and scope of the invention as expressed in the appended claims.

Referring to the drawings, 10 designates a fragment of a frame casting of a machine tool, which is shown, in the present instance, as a surface grinder adapted to grind reamers and other tools. The casting 10 is formed integral with a laterally projecting outer sleeve 11. Fitting snugly in the forward portion of the sleeve 11, and extending through a substantial portion thereof is a bearing supporting sleeve 12. Two anti-friction spindle bearings designated generally as 13 and 14 are provided in opposite ends of the sleeve 12 for a shaft or spindle 15. Since these bearings are alike in construction, only one will be described, and corresponding parts thereof will be designated by like reference characters.

The end of the sleeve 12 is internally enlarged at 16, and the off-set cylindrical surfaces are joined by an annular inclined shoulder 17. The very end of the sleeve 12 is further internally enlarged at 18 and is threaded internally. A sleeve 19 formed on its outer surface with a raised threaded section, and formed at its inner end with an internal annular shoulder 20 similar and opposite to the shoulder 17, is threaded into the end of the sleeve 12. The two shoulders 17 and 20 constitute a ball seat in the end of the spindle sleeve 12, which is adjustable by adjusting the sleeve 19. Movably mounted in the sleeve 12 is a bearing sleeve 21 having an intermediate ball section 22 formed on its outer surface and engaging the ball seat. The bore of the bearing sleeve 21 is tapered inwardly and receives a wedge sleeve 23 rotatably mounted therein and slidably fixed on one end of the shaft or spindle 15. A pair of adjusting nuts 24 and 25 are threaded onto the opposite ends of the sleeve 23, and engage the ends of the bearing sleeve 21. These nuts provide means whereby the wedge sleeve 23, can be adjusted longitudinally in the bearing sleeve 21 to take up wear. To hold the bearing sleeve 23 against rotation, and yet permit the ball section 22 to move freely in the ball seat, a screw 26 is threaded through the wall of the sleeve 12, and has a pin 27 extending loosely into an opening, preferably a bore 28, formed in the ball section 22. The bearings 13 and 14 permit alignment of the spindle 15 in the sleeve 12.

The forward end of the spindle 15 is reduced in size, thereby providing a shoulder 29. Mounted on the spindle 15, and abutting against the shoulder 29 is a ring 30, which is formed with suitable threads 31 on its periphery. These threads are provided with a large lead and a direction opposite to that in which the spindle 15 is rotated, so as to exclude any foreign matter seeking to pass to the front bearing 14.

While any desired operating element may be mounted on the spindle 15, in the present instance, a grinding wheel of any suitable type, preferably a cup shaped grinding wheel 32 tending to apply an end thrust on the spindle, is shown. The grinding wheel 32 is clamped securely against an annular aligning flange 33 on the outer face of the ring 30 by means of a washer 34 and a suitable clamping nut 35.

The rear end of the spindle 15 is connected through a universal joint 36 to a drive shaft 37 journaled in a drive shaft bearing 38. This bearing is mounted in a short bearing supporting sleeve 39 fixed in the rear end of the sleeve 11, and since it is similar to the bearings 13 and 14, the corresponding parts thereof are designated by the same reference numerals. In this bearing the sleeve 19 has an outer end wall 40 formed with a pair of spaced bores 41 adapted to receive a suitable adjusting tool (not shown), and is held in position by a lock nut 42 threaded thereon and against the outer end of the sleeve 39.

The drive shaft 37 extends through a drive sleeve 43 which extends through the wedge sleeve 23 of the bearing 38, and which is held rotatably therein by a nut 43' threaded onto its outer end. On its forward or inner end, the sleeve 43 is formed integral with a pulley 44 adapted to be driven in any suitable manner, as by a power belt (not shown). The pulley 44 is formed with a radial bore 45 (see Fig. 2), in which a key member 46 is slidably mounted, and which is closed at its outer end by a screw plug 47. The key member 46 is formed with a tapered key 48 tightly engaging either one of two longitudinal key ways 49 with tapered sides extending along opposite sides of the shaft 37, two key ways being provided to balance the weight of the shaft. The key 48 is pressed into engagement with one of the key ways 49 by a coil spring 50, disposed in a bore 51 in the key member 46 and abutting against the inner end of the plug 47.

The universal joint 36 (see Figs. 1 and 3) comprises a head 52 formed integral with the inner end of the drive shaft 37 and having an annular externally threaded flange 53. The inner edge of the flange 53 is beveled to form an annular ball seat 54 for one end of a ball member 55. A gland nut 56 having a ball seat 57 for the other end of the ball, is threaded onto the flange 53 and serves to hold the ball member in position. The ball member 55 is connected to the head 52 by a radially extending driving pin 58 fitting into a notch 59 in the end of the flange 53, and is provided with a tapered shank 60 fitting into a tapered bore 61 in the rear end of the spindle 15 in which it is rigidly secured by means of a longitudinally extending bolt 62. By providing the universal joint 36 between the spindle 15 and the drive shaft 37 no binding can result from aligning the spindle.

Means is provided to hold the spindle 15 against objectionable end play, to align the spindle, and to automatically compensate for wear and for expansion or contraction resulting from changes in temperature. By providing floating bearings, such as the bearings 13 and 14 and by connecting the spindle 15 through the universal joint 36 to the drive shaft 37 positioning of the spindle and particularly aligning thereof is placed under the absolute control of the last mentioned means.

This means (see Figs. 4 to 9) comprises a peripheral flat-sided flange 63 formed on the spindle 15 between the bearings 13 and 14. The flange 63 preferably is integral with the spindle and is made to possess good wearing qualities. Freely mounted about the spindle 15 and adapted to engage the front and rear sides of the flange 63 are two bearing rings 64 and 65, respectively. These rings preferably are made of a material substantially softer than that of the flange 63. The ring 64 fits against a radial flange 66 formed on one end of an adjusting sleeve 67 and positioned freely about the spindle, and is secured to said flange for joint rotary movement therewith by means of a pin 68. In the present instance, the flange 66 is formed on the rear end of the sleeve 67, and bears through a suitable end thrust ball bearing 69 against an annular shoulder 70 defined by the rear end wall of a housing 71. The latter is fitted snugly in the sleeve 12, and is formed on its rear end with a reduced extension 72 threaded into a radial flange 73 formed on the inner surface of said sleeve. A set screw 74 serves to secure the housing 71 in position. Thus, the shoulder 70 acting through the thrust bearing 69, the end flange 66, and the bearing ring 64 against the peripheral flange 63 serves as a stop for holding the spindle 15 against rearward movement. The location of the shoulder 70 obviously can be changed by adjusting the housing 71 in the flange 73.

To hold the flange 63 in position against the shoulder 70, so as to prevent objectionable end play, a clamping ring 75 mounted freely about the spindle 15 and pressing against the front bearing ring 65 is provided. The clamping ring 75 and the sleeve 67 are operatively connected for rotary movement together by a pin 76 extending radially from the ring into a notch 77 cut in the forward end of the sleeve (see Figs. 5 and 9). To facilitate assembly of the spindle fixture, the notch 77 is made with considerable width, extending through approximately 55°, and the pin 76 is held against one side face 78 of the notch by a coil spring 79. This spring is positioned in the notch 77 and is connected at the end adjacent the face 78 to a pin 80 extending from the front end of the sleeve 67, and at the other end to a pin 81 extending outwardly and radially from the clamping ring 75.

Figure 8:
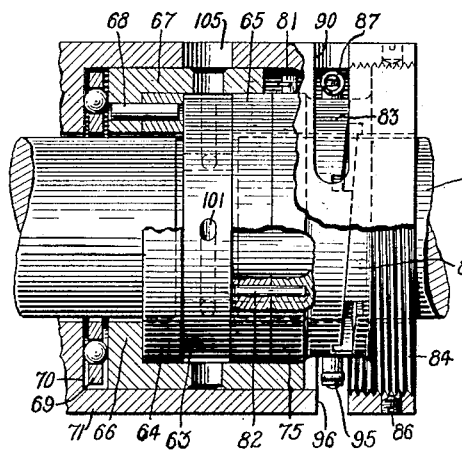
Fig. 8 is a fragmentary view partially in elevation, and partially sectioned along line 8—8 of Fig. 5.

The clamping ring 75 and the bearing ring 65 are connected for rotary movement together by a pin 82 (see Fig. 8).

To provide means for pressing the clamping ring 75 against the bearing ring 65 with a predetermined pressure, and to automatically adjust the position of said clamping ring when necessary axially along the spindle 15 to maintain such pressure, said clamping ring is formed on its front face with a plurality of cam or wedge teeth 83. An annular nut 84 fitting freely about the spindle 15 is threaded into the front end of the housing 71, and is formed on its inner end with a plurality of cam or wedge teeth 85 opposed to and coacting with the wedge teeth 83. The nut 84 is clamped rigidly and adjustably in the housing 71 by means of a plurality of set screws 86. It will be evident that if the clamping ring 75 is moved clockwise with the spindle 15, the wedge teeth 83 and 85 will relieve the pressure against the flange 63, and if the clamping ring is moved counter-clockwise, the wedge teeth will cause an increase in said pressure.

Means is provided tending to rotate the clamping ring 75 in a counter-clockwise direction with a predetermined force. This means preferably comprises an upper coiled spring 87 and a lower coiled spring 88 (see Fig. 5). The upper coiled spring is connected at its inner end to a pin 89 extending upwardly from the clamping ring 75, and extends outwardly to the left through a transverse slot 90 in the housing 71 and over the upper end of a tongue 91 into a transverse slot 92 in the sleeve 12 in which the outer end of the spring is connected to a pin 93. The tongue 91 closes a substantial portion of the inner end of the slot 92. A plurality of spaced and upwardly inclined notches 94 are formed in the sides of the slot 92, and are arranged in pairs for receiving the opposite ends of the pin 93 (see Figs. 5 and 6). It will be evident that the tension of the spring 87 can be adjusted by shifting the pin 93 from one pair to another pair of the notches 94. The lower spring is connected at its inner end to a pin 95 extending downwardly from the clamping ring 75, and extends outwardly to the right through a transverse slot 96 in the housing 71, and over the lower end of a tongue 97 into a transverse slot 98 in the sleeve 12 in which its outer end is connected to a pin 99. Opposite ends of the pin 99 are adapted to rest in any one pair of a plurality of pairs of downwardly inclined notches 100, formed in the sides of the slot 98. The spring 88 thus can be adjusted by shifting the pin 99 from one pair to another pair of the notches 100.

To lubricate the bearing surfaces between the flange 63 and the bearing rings 64 and 65, the flange is formed with a plurality of passages 101 (see Figs. 4 and 7), extending inwardly from the periphery and opening into transverse passages 102 extending through the flange. The passages 101 are inclined outwardly in the direction of rotation of the flange 63 so as to scoop up oil and force the same between the bearing surfaces. To supply oil to the annular space between the flange 63 and the sleeve 67, a plurality of peripherally spaced openings 103 are formed in the flange. These openings communicate at their outer ends with a peripheral groove 104 formed in the outer surface of the sleeve 67, and communicating at all times through a feed opening 105 extending through the casing 71 and the sleeves 12 and 11.

In operation, the pins 93 and 99 are adjusted to give the springs 87 and 88 the desired tension. This tension tends to rotate the clamping ring 75 counter-clockwise so as to increase the wedging action between the cam teeth 83 and 85 and thereby press the clamping rings 64 and 65 against the sides of the flange 63 to hold the latter in position without end play. Should the pressure between either of the bearing rings 64 and 65 and the flange 63 become small, due to wear or contraction, the clamping ring 75 will move rearwardly to tighten the bearing. If the pressure between either or both of the rings 64 and 65 and the flange 63 should become too great, due to expansion, the rings will tend through friction to rotate with the flange in a clockwise direction. This movement will rotate the clamping sleeve 67 in a clockwise direction, thereby reducing the wedging action of the teeth 83 and 85, and hence reducing the bearing pressure against the flange 63. The bearing 69 reduces the friction between the flange 66 and the shoulder 70 to permit this self adjustment. If the flange 66 were in direct engagement with the shoulder 70 the friction area between these parts would be greater than that between either of the bearing rings 64 and 65 and the flange 63, and would hence prevent such adjustment. Thus, it will be evident that by properly adjusting the tension of the springs 87 and 88, the bearing rings 64 and 65 will be clamped against the sides of the flange 63 with a substantially uniform pressure, and will prevent any material and objectionable end play or movement of the spindle. By applying a uniform pressure, the spindle will be aligned at all times, this alignment being permitted by the floating end bearings 13 and 14 and the universal joint 36. The device is thus self-adjusting to automatically compensate for wear and for expansion and contraction of parts resulting from changes in temperature. The device is simple and inexpensive in construction, will operate efficiently for a long time without necessitating manual adjustment or wear, and can be easily and correctly assembled.

I claim as my invention:

1. A spindle fixture having, in combination, a housing having an annular shoulder in one end, an adjustable nut rigidly secured in the other end of said housing, a sleeve mounted for rotation in said housing and having a radial end flange disposed next to said shoulder, an end thrust bearing between said shoulder and said flange, a bearing ring mounted in the inner end of said sleeve against said flange, means connecting said flange and said bearing ring for joint rotary movement, a bearing ring mounted in the other end of said sleeve, a clamping ring disposed between said nut and said last mentioned bearing ring, means connecting said sleeve and said clamping ring for joint rotary movement, means connecting said last mentioned bearing ring and said clamping ring for joint rotary movement, a spindle extending freely through said housing, said sleeve, said rings, and said nut, said spindle having a peripheral enlargement disposed between said bearing rings, said nut and said clamping ring having opposed wedge teeth coacting with each other to clamp said bearing rings against said enlargement upon rotary movement of said clamping ring opposite to said spindle, and to release the pressure between said clamping rings and said enlargement upon rotary movement of said clamping ring with said spindle, adjustable spring means tending to rotate said clamping ring in said first mentioned direction, friction between said bearing rings and said enlargement being adapted to rotate said clamping ring with said spindle, and floating bearings supporting said spindle at opposite sides of said housing.

2. A spindle fixture having, in combination, a housing having an annular shoulder in one end, an adjustable cam nut rigidly secured in the other end of said housing, a sleeve mounted for rotation in said housing and disposed against said shoulder, a bearing ring mounted in said sleeve, means connecting said sleeve and said bearing ring for joint rotary movement, a second bearing ring mounted in said sleeve, a clamping ring disposed between said nut and said second bearing ring, means connecting said sleeve and said clamping ring for joint rotary movement, means connecting said second bearing ring and said clamping ring for joint rotary movement, a spindle extending loosely or freely through said housing, said sleeve, said rings, and said nut, said spindle having a peripheral enlargement disposed between said bearing rings adapted to rotate the latter through excessive friction, said nut and said clamping ring having opposed cam faces coacting with each other to clamp said bearing rings against said enlargement upon rotary movement of said clamping ring opposite to said spindle and to release the pressure between said clamping rings and said enlargement upon rotary movement of said clamping ring with said spindle, and means tending to rotate said clamping ring in said first mentioned direction.

3. A spindle fixture having, in combination, a spindle having a peripheral enlargement, a pair of bearing members respectively pressing against opposite sides of said enlargement and being rotatable therewith through friction when the pressure exceeds a predetermined value, a clamping member connected to both of said bearing members for rotary movement therewith, said clamping member upon rotary movement by said bearing members being movable along said spindle to reduce the bearing pressure, and upon rotary movement counter to said spindle being movable along said spindle to press said bearing members against said enlargement, and means tending to rotate said clamping member with a predetermined force in a direction counter to said spindle.

4. A spindle fixture having, in combination, a spindle having a peripheral enlargement, a fixed stop, a sleeve having bearing means on one end disposed between said enlargement and said stop and having a wide notch in its other end, a fixed cam member, a rotary cam member coacting with said fixed cam member, said rotary cam member having a pin projecting into said notch, spring means for holding said pin against one side of said notch, said rotary cam member upon rotary movement counter to the spindle being adapted to press said enlargement against said bearing means and said sleeve against said stop, and upon rotary movement with said spindle serving to reduce said pressure, and means tending to turn said rotary cam member counter to said spindle.

5. A spindle fixture having, in combination, a sleeve, universal bearings in opposite ends of said sleeve, a spindle rotatably mounted in said bearings, said spindle having a peripheral flange, a pair of bearing rings engaging opposite sides of said flange, and means for pressing said rings against said flange, said means being self-adjustable upon rotary movement of either or both of said rings with said flange to reduce said pressure, and upon looseness between said rings and said flange to increase said pressure.

6. In a spindle fixture, in combination, a spindle having a peripheral enlargement, bearing means engaging opposite sides of said enlargement, means enclosing said enlargement and said bearing means and defining a narrow annular space about the periphery of said enlargement for receiving a lubricant, said enlargement being formed with a plurality of oil ducts terminating at its sides and at its periphery, and being inclined toward said periphery in the direction of rotation of said spindle to scoop up lubricant in said chamber, and means for automatically maintaining a predetermined bearing pressure between said enlargement and said bearing means.

7. A spindle fixture having, in combination, a fixed stop, a spindle having a peripheral enlargement, a sleeve enclosing said enlargement, said sleeve having means at one end bearing against said stop and against one side of said enlargement, and means for pressing said enlargement against said sleeve and said sleeve against said stop, said means being operable through friction between said sleeve and said enlargement to reduce the bearing pressure.

8. A spindle fixture having, in combination, a spindle having a peripheral enlargement, a fixed stop, a sleeve having bearing means on one end disposed between said enlargement and said stop, a fixed cam member, a rotary cam member coacting with said fixed cam member, said rotary cam member being operatively connected to said sleeve for rotary movement therewith, said rotary cam member upon rotary movement counter to the spindle being adapted to press said enlargement against said bearing means and said sleeve against said stop, and upon rotary movement with said spindle serving to reduce said pressure, and means tending to turn said rotary cam member counter to said spindle, friction between said bearing means and said enlargement tending to turn said rotary cam member with said spindle.

9. In a spindle fixture, in combination, a spindle having a peripheral enlargement, bearing means engaging opposite sides of said enlargement, means enclosing said enlargement and and defining a space about the periphery thereof for containing a lubricant, said enlargement being formed with a plurality of oil ducts opening at its periphery and at its sides for directing lubricant from said space to the bearing surfaces, and self-adjustable means automatically operable to maintain a predetermined pressure between said enlargement and said bearing means.

10. A spindle fixture having, in combination, a sleeve, two spaced universal bearings in said sleeve, a spindle rotatably mounted in said bearings, a third universal bearing, a drive shaft rotatably mounted in said last mentioned bearing, a universal connection between said drive shaft and one end of said spindle, an annular stop encircling said spindle and peripherally spaced therefrom, a peripheral abutment on said spindle, and means for seating and holding said abutment squarely against said stop to automatically maintain said spindle in a fixed longitudinal position and in predetermined longitudinal alignment.

11. A spindle fixture having, in combination, a sleeve, a spindle rotatably mounted in said sleeve and having oppositely disposed peripheral shoulders, a pair of bearing members respectively engaging said shoulders, said bearing members being yieldably connected for joint rotary movement, and means for pressing said bearing members against said shoulders, said means being self-adjustable upon rotary movement of either of said members with or counter to said spindle resulting respectively from excessive friction and looseness.

12. A spindle fixture having, in combination, a sleeve having an inner flange, a housing removably secured in said flange, a rotary spindle extending through said housing and having oppositely disposed peripheral shoulders located in said housing, two spaced bearing members respectively arranged to engage said shoulders, means connecting said bearing members for joint rotary movement but permitting relative and independent axial movement, and coacting cam means acting through said housing and said first mentioned means to press said bearing members against said shoulders with a predetermined pressure.

13. A spindle fixture having, in combination, a spindle having peripheral shoulders presented in opposite directions lengthwise of said spindle, a fixed annular stop about said spindle, a sleeve disposed about said shoulders and having an end flange adjacent said stop, a thrust bearing between said flange and said stop, bearing means in said sleeve disposed against said flange for rotary movement therewith and bearing against the adjacent shoulder on said spindle, and means coacting with the other of said shoulders and tending to press said bearing means against said adjacent shoulder, said last mentioned means being self-adjustable through variations in friction between said bearing means and said adjacent shoulder so as to compensate for said variations.

14. A spindle fixture having, in combination, a sleeve having a peripheral slot opening through a portion of its wall, a tongue closing a portion of the inner end of said slot and having a free rounded end, a housing in said sleeve having a peripheral slot in its wall in registration with said first mentioned slot, a spindle having a pair of oppositely disposed peripheral shoulders, a pair of bearing members arranged to engage said shoulders to hold said spindle against axial movement, and means tending to press said bearing members against said shoulders, said means comprising a rotary cam member adjustable in one direction to increase the pressure between said shoulders and said bearing members and adjustable in the other direction to decrease said pressure, a coil spring connected at one end to said rotary cam member and extending outwardly into said first mentioned slot, and means for adjustably fixing said spring selectively in different positions in said slot peripherally of said sleeve, said spring resting on the free end of said tongue and tending to rotate said cam member in said first mentioned direction.

15. Means for preventing end play of a rotary element, comprising two rotatable abutments between which said element is disposed, a lost motion connection between said abutments, spring means connecting said abutments and tending to take up lost motion therebetween to cause said abutments to be constrained yieldingly for joint rotary movement, and means tending to press said abutments against said element with a predetermined bearing pressure, said means being self-adjustable upon variation in friction between either of said abutments and said element.

16. A spindle fixture having, in combination, a bearing, a sleeve journaled in said bearing, a drive pulley on said sleeve, a drive shaft extending through and splined for axial movement in said sleeve, a rotatable spindle substantially in longitudinal alinement with said shaft, a universal connection between one end of said shaft and the adjacent end of said spindle, an annular stop encircling said spindle, a peripheral abutment on said spindle, and means for seating and holding said abutment squarely against said stop to automatically maintain said spindle in a fixed longitudinal position.

17. Means for preventing end play between an elongated rotary machine element having two opposed peripheral surfaces respectively facing in generally opposite axial directions, and an axially fixed annular member about said element having a bearing surface in engagement with one of said opposed surfaces to limit relative axial shifting endwise movement in one direction, said means comprising, in combination, an axially adjustable annular member about said element, said adjustable member having a bearing surface in engagement with the other of said opposed surfaces and having an annular shoulder facing generally in the same direction as said other surface, a fixed annular clamping ring about said element, a rotatable annular clamping ring about said element between said fixed ring and said shoulder and engaging at one side against said shoulder, the other side of said rotatable ring and the adjacent side of said fixed ring respectively having opposed oppositely inclined coacting cam faces adapted upon relative movement in one direction to spread said rings, and spring actuated means tending to rotate said rotatable ring to actuate said faces in said one direction, whereby said fixed member is held with a predetermined bearing pressure against said element.

18. Means for preventing end play between an elongated rotary machine element having two opposed peripheral surfaces respectively facing in generally opposite axial directions, and an axially fixed member having a bearing surface in engagement with one of said opposed surfaces, said means comprising, in combination, an axially adjustable member having a bearing surface in engagement with the other of said opposed surfaces, an axially fixed annular clamping ring, a second annular clamping ring between said fixed ring and said adjustable member and movable axially with the latter, the adjacent sides of said rings having opposed coacting wedge teeth adapted upon relative movement in one direction to spread said rings, one of said rings being fixed against rotation and the other of said rings being rotatable, and spring actuated means tending to rotate said rotatable ring to adjust said teeth in said one direction, whereby said fixed member is held with a predetermined bearing pressure against said element.

GERARD A. DE VLIEG.